Nov. 1, 1927.
W. H. FURNESS
1,647,791
ARTIFICIAL SILK THREAD MAKING APPARATUS
Filed Nov. 2, 1923      3 Sheets-Sheet 3
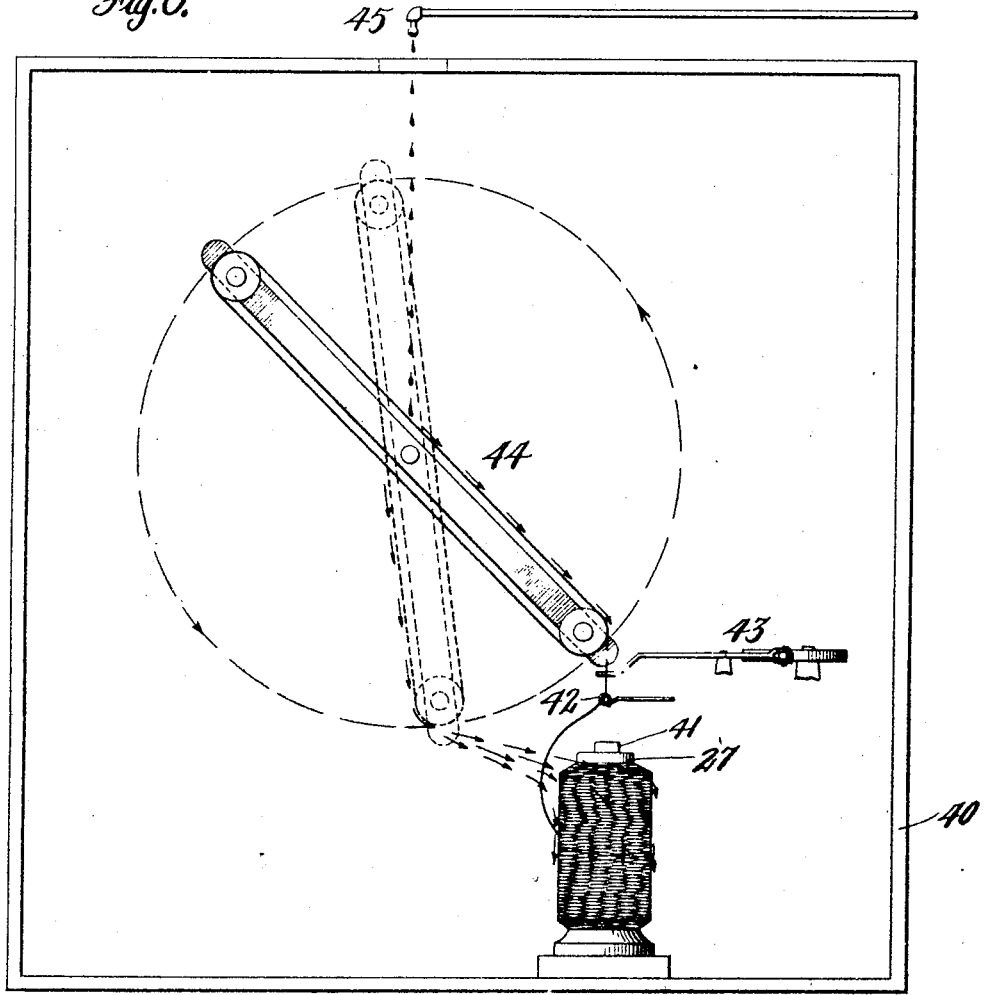
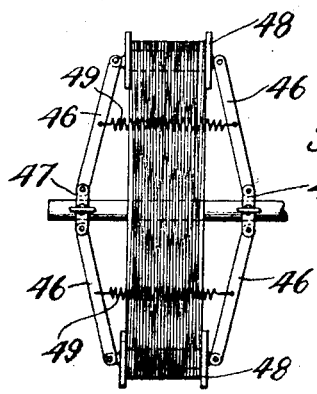

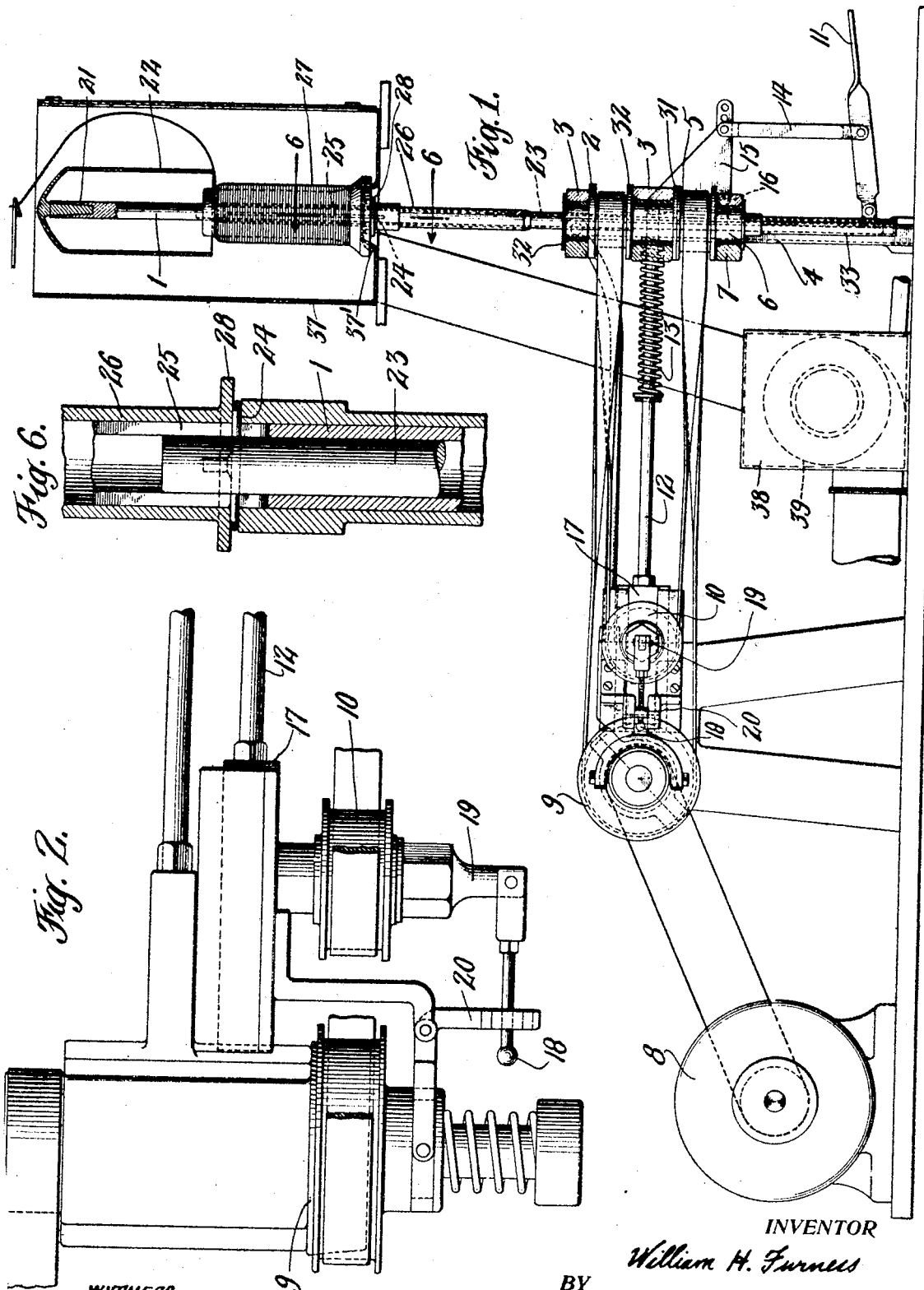

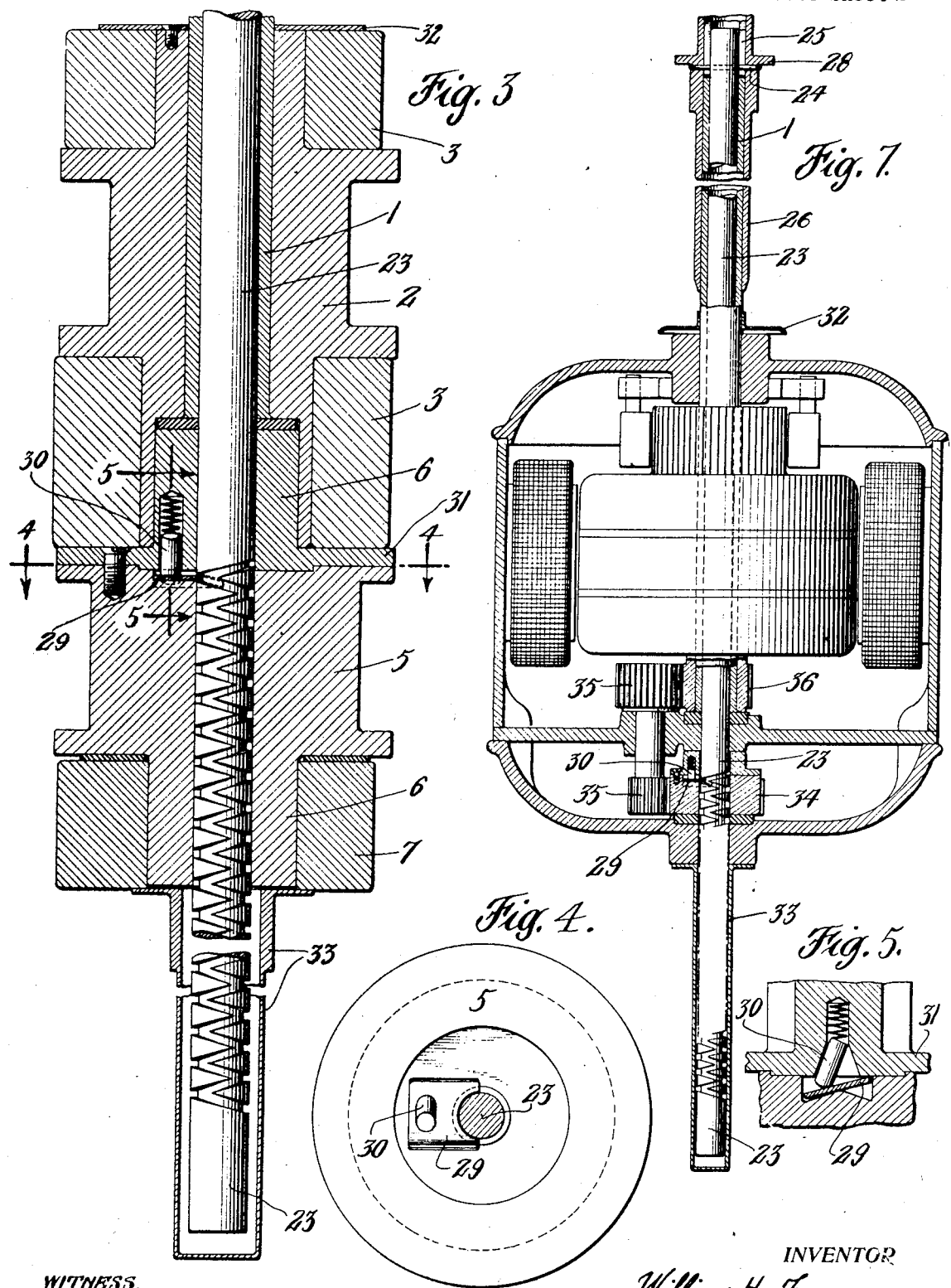

Patented Nov. 1, 1927.

1,647,791

UNITED STATES PATENT OFFICE.

WILLIAM H. FURNESS, OF NATIONAL PARK, NEW JERSEY, ASSIGNOR TO CELLOCILK COMPANY, OF PHILADELPHIA, PENNSYLVANIA, A CORPORATION OF DELAWARE.

ARTIFICIAL-SILK-THREAD-MAKING APPARATUS.

Application filed November 2, 1923. Serial No. 672,301.

This invention relates to apparatus for the winding and twisting of artificial silk thread and the like on to bobbins or spools.

One of the primary objects of the invention is to provide an improved arrangement of cap and spool or bobbin operating mechanism.

Still another object resides in the simplification of the actuating mechanism in apparatus of the class disclosed in my Patent #1,338,648.

My invention also contemplates the improved features of construction and combination of parts and operations hereinafter to be more fully set forth.

The foregoing, together with such other objects as may hereinafter appear, or are incident to my invention, I obtain by means of a construction which I have illustrated in preferred form, wherein:

Fig. 1 is an elevation of a winding apparatus with the bearings and spindle cap in section.

Fig. 2 is a fragmentary plan of the clutch and slippage mechanism.

Fig. 3 is an enlarged sectional view of a portion of the spindle and associated parts.

Fig. 4 is a plan section taken on the line 4—4 of Fig. 3.

Fig. 5 is a fragmentary sectional view taken on the line 5—5 of Fig. 3.

Fig. 6 is a fragmentary sectional view taken on the line 6—6 of Fig. 1.

Fig. 7 is a vertical sectional view of a modified form of drive mounted directly around the spindle.

Fig. 8 is an elevation of the reeling device used in connection with my apparatus and Fig. 9 is a modified form of reel.

Referring now to Figs. 1 to 6 inclusive it will be seen that the apparatus, in general, comprises an upright spindle 1, adapted to be rotated by a pulley 2, for which bearings 3 carried by the frame 4, are provided. Another pulley 5 is mounted to rotate on the same axis as the spindle 1, and has at its upper end an extension 6, which fits within the pulley 2, thereby providing a bearing at this end, and at its lower end a similar extension having a bearing 7 mounted on the frame 4. The pulleys are rotated by means of a motor 8, or other suitable source of power. In order to reduce the starting load on the motor and to prevent excessive vibration of the spindle when starting, I have provided a combined clutch and slippage mechanism consisting of a spring engaged cone clutch 9, and an idler 10, which may be termed a belt tightener. When it is desired to start the device in operation the foot pedal 11 is depressed to the limit of its movement which moves the rod 12 to the right against the action of the spring 13, thru the medium of the link 14, adjustably connected to the plate 15, which is pivoted to the frame 4 at 16. The rod 12 is secured to the block 17 on which the idler 10 is mounted so that it is carried with the rod, thereby causing the belt to run slack. By this time, the headed rod 18 which is pivotally secured to the idler stud 19, engages the bell crank lever 20, which releases the clutch 9. The motor may now be started. By gradually releasing the pressure from the foot pedal the clutch takes hold but as the spring 13 is subject to the control of the foot lever the belt is allowed to slip and gradually take hold under the control of the operator.

Referring more particularly to Figs. 1, 2 and 3, it will be seen that the spindle 1 is rigidly secured into the driving pulley 2, and is provided at its upper end with the tapered hole 21, for receiving the tapered shank projecting within the inverted cup shaped cap 22. This tapered fit causes the cap to revolve with the spindle and at the same time allows for ready removal of the cap when desired. The cap has its upper portion conically shaped with its edges smoothed and rounded over so that the thread may be readily pushed over the end thereof if it should break and wind upon the cap. Extending up from its lower end the spindle is hollow for the greater portion of its length to receive the rod 23, which is provided with a pin 24 extending thru the slot 25 in the hollow portion of the spindle and into the sleeve 26, which carries the spool or bobbin 27 on the shoulder 28. It will be seen that by this arrangement the spindle 1, the rod 23, the sleeve 26 and the bobbin 27 are all rotated at the same speed. The bobbin may be connected to the sleeve 26 by pins or other suitable means which will insure a positive driving connection between the two, at the same time allowing for ready removal of the bobbin.

The lower portion of the rod 23 is provided with a crossed right and left hand thread which serves to impart a reciprocatory motion to the sleeve carrying the bobbin, for the purpose of uniformly laying the threads on said bobbin. Such motion is brought about as follows; the pulley 5 which is of somewhat larger diameter than the pulley 2 carries a reversing shoe 29 mounted in a depression in its upper face, said depression having a V shaped bottom which acts as a pivot for the shoe when it reaches the end of its travel on the thread in either direction. It will be seen that the difference in speed of the rod 23 and the pulley 5 causes the rod to move either up or down such movement being brought about by the crossed right and left hand threads. In order to prevent the shoe from taking a course other than intended I have provided the spring pressed plunger 30, tending to hold the shoe at the angle to which it is thrown at the end of each stroke. The spring and plunger are mounted in the upper section 31 of the pulley 5.

As a means for preventing the chemicals used in the manufacture of the thread from entering onto the working parts of my device I have made the sleeve 26 of such length as to keep the slots 25 covered at all times. The plates 32 prevent such chemicals from working in at the top to the bearings and the cap 33 protects the lower bearing and the threaded rod 23.

Surrounding the bobbin 27 and cap 22 may be a guard member 37 which is provided with a door to permit of ready application of the thread to the bobbin when starting. The chemicals thrown off due to the speed of the machine are collected by the guard member 37 and are prevented from running out around the spindle by the cup shaped portion 37' and then run down into the housing 38 from which they may be drawn and returned to the system. The housing 38 and the single exhauster 39 may obviously be arranged to serve a battery of winding devices.

The operation of my device as thus far described is as follows: A group of filaments is led thru the eyelet located directly above the cap 22, down to the bobbin 27 and is whipped around the bobbin, immediately taking hold owing to the moistness of the thread and to the speed of the bobbin and then engages the lower edge of the cap which is slightly rounded so as to present a smooth surface to the thread. Since the cap and bobbin are rotating at the same speed the thread swings outwardly under the action of centrifugal force. It is to be noted therefore, that when the group of filaments is not fed it remains in contact with one point of the edge of the cap and the result is that the individual filaments are twisted into a thread. As the group is fed it continues to twist but owing to the resistance offered to its revolution by the air it lags behind and is gently laid on the spool or bobbin in alternately reversed spiral layers due to the reciprocatory movement of the bobbin. On account of the increase in diameter of the layers as the spool fills up, there is a slight change in twist, but the difference is neutralized and the twist made uniform when the thread is removed over the end of the bobbin onto a reel for further treatment thereof, as will further appear.

The device as shown in Fig. 1 is a single unit, but it is to be understood that by the employment of a countershaft a gang of such devices may be arranged side by side, in which case any number of devices may be thrown into or out of operation by proper manipulation of the clutches.

One of the particular advantages of the driving and bobbin reciprocating mechanism is that the jarring and vibration incident to the cam devices heretofore employed are obviated and the breakage of the thread minimized.

In the modification illustrated in Fig. 7 the same general construction of parts operating in the same general way as that previously described is employed. In this instance, however, the motor is shown mounted directly around the spindle so that the spindle acts as the motor shaft. The reversing shoe 29 in this case is carried by a gear 34 connected by means of the gears 35, 35 to a gear 36 which is shrunk onto the spindle. It will be seen that by such a motor arrangement the devices may be arranged in gangs with great economy of floor space as well as a great reduction in the number of parts.

After having laid the thread on the bobbin as previously described it is now ready for the reeling, washing and drying operations. Referring now to Fig. 8, it will be seen that the reeling and washing device which I employ in conjunction with my winding device and which is part of my complete apparatus, consists of a box or casing 40, and has mounted therein a stud or post 41 for receiving the filled bobbin 27 while still in a moist condition. The thread is led over the upper end of the bobbin, thru the eyelet 42, thru the hole in the crossing device 43 and onto the two posted flat reel 44 which when rotated reels the thread from the bobbin.

Washing fluid is supplied thru the pipe and nozzle 45 which is so positioned with respect to the reel as to spray or drop the fluid onto the thread at the centre of rotation where it is divided by the alternation of the effect of gravity and carried outward on the threads to the ends of the reel by centrifugal force to prevent any deterioration incident to the thread drying. A sufficient quantity of liquid is swished onto the bobbin to insure effective washing of the thread before it reaches the reel. By this method of washing, the destructive effect of surface tension which occurs where reels of other shapes running partly submerged in a liquid bath have been employed is eliminated and a much greater speed than has been heretofore possible may be employed without injury to the thread. The spraying of the bobin is also of assistance in this regard. Also a maximum washing effect is produced from a minimum amount of washing fluid. Another advantage of this method lies in the fact that the thread as it is wound on the reel is followed by the washing fluid through its entire length which is not the case where round or polygonal reels are used in which the liquid is thrown off by centrifugal force without producing as uniform and as appreciable a washing effect. Furthermore, by my improvements the thread windings are, as it were, individually washed. My improved form of reel also readily adapts itself for tying the thread into neat hanks or skeins without first unwinding from the reel, and without incurring tangling and breaking of the threads. In addition the tension is substantially uniform throughout. The flat shape of these reels is found very advantageous when handling them for further washing and for drying. The reels, preferably as fast as wound, are hung on a conveyor so as to depend in a trough filled with water or other washing fluid, from which they are conducted through a dryer and then the threads are tied in skeins and removed as above set forth.

In the modified form of reel shown in Fig. 9 I have provided the links 46 carried by the collars 47, 47, which may be fastened to the shaft by means of thumb screws. The other ends of the links are fastened to the posts 48. The springs 49, 49 hold the parts in proper position. When it is desired to loosen or produce additional tension on the thread the thumb screws are loosened and the collars moved outwardly or inwardly thereby adjusting the posts correspondingly.

No claim is herein made to the process described, since such process constitutes the subject matter of divisional application Ser. No. 212,194, filed Aug. 11, 1927.

I claim:

1. An artificial silk thread making machine comprising in combination a cap and its spindle, a bobbin and its spindle, the spindles being coaxial and being rotated at the same speed, and means coaxial with said spindles operating to cause one of said spindles to move longitudinally with respect to the other spindle.

2. An artificial silk thread making machine comprising in combination a cap and its spindle, a bobbin and its spindle, the spindles being coaxial and being rotated at the same speed, and means coaxial with said spindles and associated with the bobbin spindle operating to cause the bobbin spindle to move longitudinally with respect to the cap spindle.

3. An artificial silk thread making machine comprising in combination a cap and its spindle, a bobbin and its spindle, the spindles being coaxial and being rotated at the same speed, crossing right and left hand threads on the bobbin spindle, and rotatable means coaxial with said spindles cooperating with the threads on the bobbin spindle to cause said spindle to move longitudinally with respect to the cap spindle.

4. An artificial silk thread making machine comprising in combination, a cap and its spindle, a bobbin and its spindle, the spindles being coaxial and being rotated at the same speed, rotatable means coaxial with said spindles operating to cause one of said spindles to move longitudinally with respect to the other spindle, and a single source of power for driving the spindles and the aforesaid rotatable means.

5. An artificial silk thread making machine comprising in combination, a cap and its spindle, a bobbin and its spindle, the spindles being coaxial and being rotated at the same speed, rotatable means coaxial with said spindles operating to cause one of said spindles to move longitudinally with respect to the other spindle, and a single source of power for driving the spindles and the aforesaid rotatable means, together with means associated with the spindles and the rotatable means whereby they are driven at different speeds from said single source of power.

6. An artificial silk thread making machine comprising in combination a cap and its spindle, a bobbin and its spindle, the spindles being coaxial and being rotated at the same speed, means coaxial with said spindles operating to cause one of said spindles to move longitudinally with respect to the other spindle, a pulley wheel for the spindles, and a pulley wheel for said coaxial means, said pulley wheels being of different diameters.

7. An artificial silk thread making machine comprising in combination a cap and its spindle, a bobbin and its spindle, the spindles being coaxial and being rotated at the same speed, means coaxial with said spindles operating to cause one of said spindles to move longitudinally with respect to the other spindle, a pulley wheel for the spindles and a pulley wheel for said coaxial means, said pulley wheels being of different diameters, together with a belt passing over said pulleys, and means for driving the belt.

8. An artificial silk thread making machine comprising in combination, a cap and its spindle, a bobbin and its spindle, the spindles being coaxial and being rotated at the same speed, rotatable means coaxial with said spindles operating to cause one of said spindles to move longitudinally with respect to the other spindle, and a single source of power for driving the spindles and the aforesaid rotatable means, together with means for gradually applying the power.

9. An artificial silk thread making machine comprising a cap and its spindle, a bobbin and its spindle, said spindles being coaxial, means for rotating said spindle at constant speeds, one of said spindles having a right and left hand thread, and means engaging said thread for imparting reciprocating movement to said bobbin.

In testimony whereof, I have hereunto signed my name.

WILLIAM H. FURNESS.